Oct. 5, 1965   O. L. COLWELL   3,209,659
CYLINDER SLEEVE SEAL
Filed Dec. 31, 1962
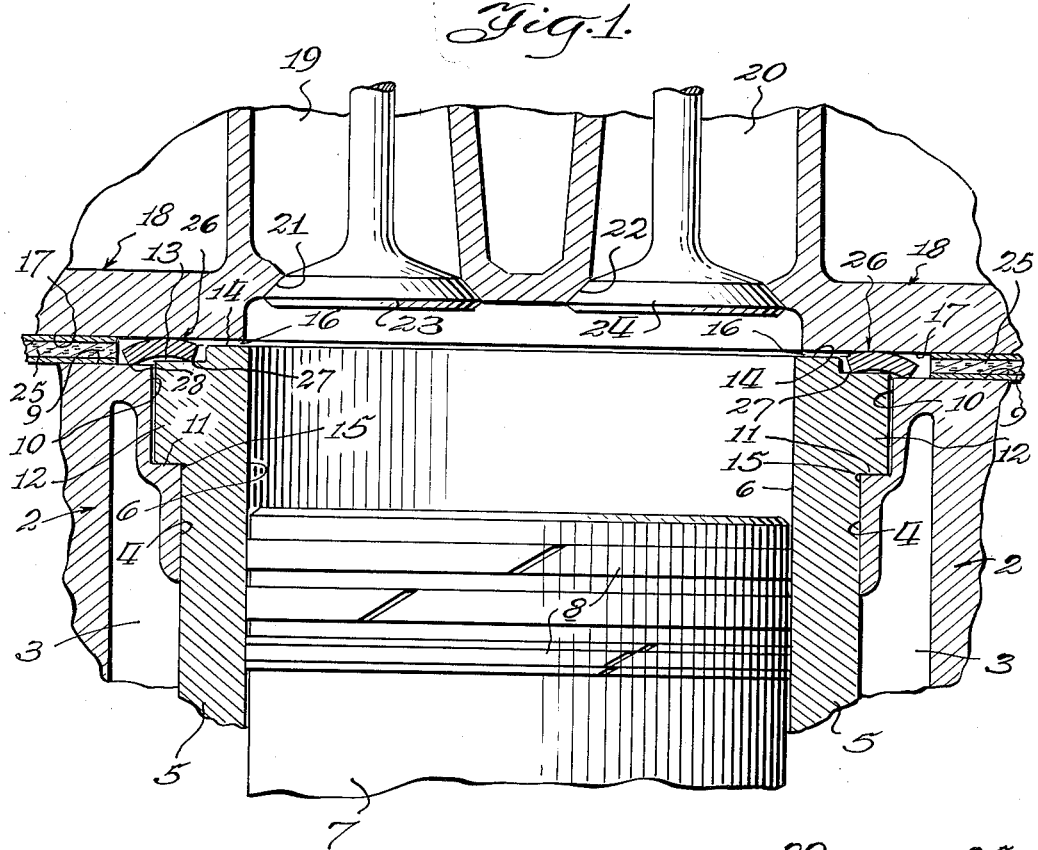
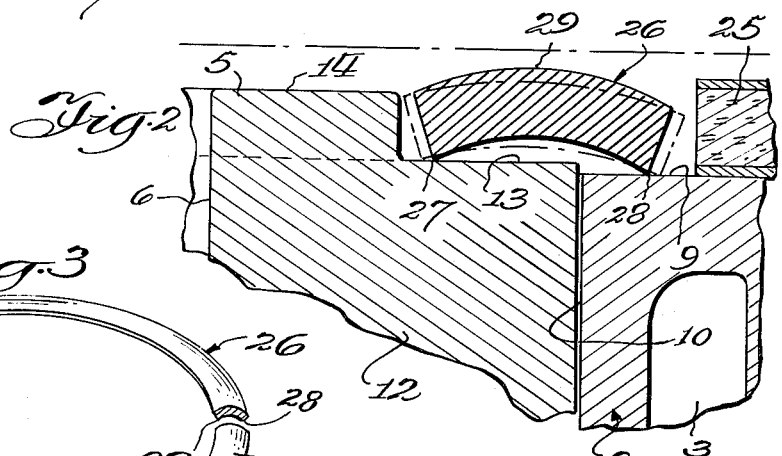
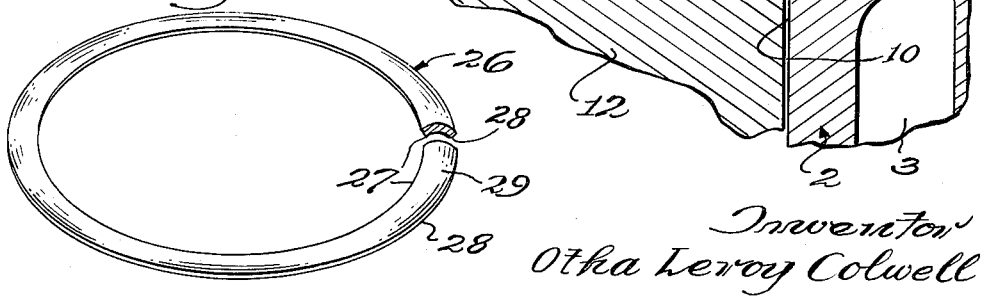
Inventor
Otha Leroy Colwell
By Schneider, Dressler, Goldsmith & Clement
Attorneys

United States Patent Office 3,209,659
Patented Oct. 5, 1965

3,209,659
CYLINDER SLEEVE SEAL
Otha Leroy Colwell, Mount Prospect, Ill., assignor to Felt Products Mfg. Co., a corporation of Illinois
Filed Dec. 31, 1962, Ser. No. 248,725
12 Claims. (Cl. 92—171)

This invention relates to a cylinder sleeve seal for internal combustion engines, and is particularly concerned with an annular gasket extending around the upper end of a cylinder sleeve and providing an effective seal between the cylinder sleeve and the bottom face of the cylinder head. The seal provides protection against the temperature and pressure created by the explosion of fuel in the cylinder sleeve, and against the cooling liquid of the cylinder block.

The gasket of the present invention is of particular importance in connection with heavy duty engines, in which a seal is required to withstand substantial pressure at a very high temperature. It has been customary heretofore to use a flat gasket of compressible material capable of withstanding the temperature and pressure created by the explosion of fuel in the cylinder sleeve. The gasket is thicker than the space between the surface on which it seats and the bottom face of the cylinder head. When the cylinder head is bolted to the cylinder block the gasket is compressed and forms a seal that is effective at the time it is originally installed. Excessive heat causes the compressible material to deteriorate and this impairs the effectiveness of the seal.

In making repairs to an engine it is often necessary to remove the cylinder head from the cylinder block. When this is done, the flat gasket remains in its compressed position. Even if the sealing characteristics of the gasket are not impaired by the heat, the mechanic cannot be sure that the cylinder head will again compress the gasket when the cylinder head is replaced on the cylinder block and bolted thereto after it has been removed therefrom. The gasket may be deformed to such an extent in some regions by the original pressure of the cylinder head, that those regions of the gasket are not compressed again when the cylinder head is replaced. A satisfactory seal must seal effectively against the explosion pressure after the cylinder head has been removed and replaced.

In current practice, one design of internal combustion engine has a removable sleeve in each cylinder. Each sleeve has its upper edge spaced slightly below the bottom face of the cylinder head. It also has an external annular flange below its upper edge. The base of the cylinder block has an annular shoulder below its top for seating the flange of the sleeve. Manufacturing tolerances in the production of these engines are chosen so as to cause the top of the flange of the cylinder sleeve to extend slightly above the top of the cylinder block.

The gasket of the present invention is annular, and has a mean diameter approximately equal to the diameter of the outer edge of the flange of the cylinder sleeve. The inner edge portion of the gasket engages the top surface of the flange, and its outer edge portion engages the top surface of the cylinder block, thus spanning the annular joint between the cylinder sleeve and the cylinder block. The material of which the gasket is made is capable of withstanding the heat and pressure caused by the repeated explosions of fuel in the cylinder sleeve indefinitely without deterioration. The gasket material is not compressible in the ordinarily accepted sense of the word, but, because of its shape, may be deformed slightly by the presure of the parts between which it is mounted when the cylinder head is bolted to the cylinder block.

The gasket has an arcuate cross sectional configuration and its central crowned portion projects slightly above the top surface of the cylinder sleeve when it is positioned on top of the cylinder block and the flange of the cylinder sleeve. When the cylinder head is bolted to the cylinder block it deforms the gasket by pressing against the upper crowned surface of the gasket and spreading the gasket into a flatter arcuate shape. Deformation of the gasket presses the lower edge portions of the gasket into sealing engagement with the top surface of the cylinder block and the top surface of the flange of the cylinder sleeve. Thus, when the gasket is pressed between the cylinder head on one side, and the cylinder sleeve and the cylinder block on the other, it provides three concentric circular sealing zones in the region surrounding the bore of the cylinder sleeve.

The gasket material has sufficient resilience to enable it to recover its original shape to a substantial extent when the pressure is released by removal of the cylinder head from the cylinder block. Complete recovery of the exact arcuate shape of the gasket is not required, but it is essential that when the cylinder head is removed, the upper crowned surface of the arcuate portion of the gasket must project above the horizontal plane of the top surface of the cylinder sleeve, so that when the cylinder head is replaced on the cylinder block the gasket will again be deformed to provide the three concentric circular sealing zones.

The structure, by means of which the above noted and other advantages of the invention are attained, will be described in the following specification, taken in conjunction with the accompanying drawings, showing a preferred illustrative embodiment of the invention, in which:

FIGURE 1 is a fragmentary cross sectional view of one cylinder of an engine, showing the gasket in the environment in which it is used to form a cylinder sleeve seal;

FIG. 2 is an enlargement of the section of FIG. 1 showing the gasket in its relationship to the cylinder sleeve and the cylinder block; and FIG. 3 is a perspective view, on a reduced scale, showing the gasket with a portion broken away to show the cross sectional configuration of the seal.

Referring to the drawings, a cylinder block 2 is provided with an opening 3 for the circulation of a cooling fluid, such as water, and with a bore 4 for the reception of a cylinder sleeve 5. Sleeve 5 has a cylindrical opening 6 in which a piston 7 is reciprocated. The diameter of the piston is slightly less than the internal diameter of opening 6, and the piston is provided with a plurality of piston rings 8 in conventional manner. The cylinder block is counterbored adjacent its top surface 9, as indicated at 10, to form a shoulder 11 providing a positive seat for an annular flange 12. The top surface 13 of flange 12 is located just below the plane of top surface 14 of sleeve 5. Flange 12 is preferably integral with sleeve 5. Sleeve 5 is recessed adjacent the lower edge of flange 12, as shown at 15, FIG. 1, to insure a smooth fit between the lower surface of flange 12 and the upper surface of shoulder 11. The upper edge portion of sleeve 5 extends a short distance above the plane of top surface 13 of flange 12 to reduce the size of the opening 16 between the top surface of sleeve 5 and the bottom face 17 of a cylinder head 18 which is bolted on top of cylinder block 2 in conventional manner.

The cylinder head has two openings 19 and 20 provided at the bottom with valve seats 21 and 22, respectively, for valves 23 and 24, which provide the intake and exhaust for the cylinder. The bottom face 17 of cylinder head 18 extends in a horizontal plane above top surface 14 of sleeve 5 to cover the cylinder block 2. The space between bottom face 17 of cylinder head 18 and top surface 9 of the portion of cylinder block 12 spaced outwardly from the periphery of cylinder sleeve 5 is sealed by a gasket 25 of any suitable compressible material. Gasket 25 is thicker than the space between bottom face 17 of the cylinder head and top surface 9 of the cylinder block and is suitable for sealing the area spaced from the cylinder sleeve because the cylinder block is relatively cool in the region where gasket 25 is used.

Gasket 25 cannot be extended inwardly to provide a seal between bottom face 17 of the cylinder head and top surface 13 of flange 12 because this area is so hot that conventional gasket material of the type used for gasket 25 would deteriorate from the heat, the gasket would lose its compressibility, and its sealing ability would be seriously impaired. Spacing gasket 25 from the heat of the cylinder sleeve enables it to retain its compressibility so that it can be used as a supplementary seal.

In the manufacture of engines, certain tolerances are required to make such manufacture commercially feasible. As a consequence of such tolerances the plane of top surface 13 of flange 12 is slightly higher than the plane of top surface 9 of cylinder block 2. The gasket 26 is designed to provide a seal between bottom face 17 of the cylinder head and top surfaces 9 of the cylinder block and 13 of the cylinder sleeve. This region is very hot, and gasket 26 withstands the heat without deterioration, as well as the pressure created by the explosion of fuel in the cylinder sleeve. The explosion pressure may be 1500 p.s.i. or higher. Gasket 26 additionally seals the top surfaces 9 and 13 against seepage of water from the annular joint between the outer surface of sleeve 5 and the adjacent surface of cylinder block 2. The opening 3 for the circulation of water in the cylinder block extends to a portion of the cylinder sleeve 5, as shown in FIG. 1, and cooling water that may seep through the joint between the cylinder sleeve and the cylinder block is confined between the circular sealing zones 27 and 28.

Gasket 26 comprises an annular member of material capable of withstanding the high temperature and the pressure created by the explosion of fuel in the upper end of the cylinder sleeve. The gasket has an arcuate configuration in cross section and has sufficient resilience so that after it has been deformed by bolting the cylinder head to the block, it will recover a substantial portion of its original position when the cylinder head is removed, regardless of how long the gasket has been deformed. One desirable characteristic of a material suitable for use in making gasket 26 is the absence of scoring or abrading of either of the surfaces 9 or 13 engaged by the gasket when it is pressed against said surfaces by bolting the cylinder head against the cylinder block. One example of material that has been found to be satisfactory for gasket 26 is the stainless steel commercially available as No. 302. This steel is composed of up to 0.15% carbon, up to 2.00% manganese, up to 1.00% silicon, up to 0.045% phosphorus, up to 0.030% sulphur, from 17.00 to 19.00% chromium, from 8.00 to 10.00% nickel, and the remainder iron.

Gasket 26 has an inner diameter large enough to encircle upper edge portion 14 of sleeve 5 and is positioned between the upper edge portion of sleeve 5 and supplementary sealing gasket 25. The lower inner edge portion 27 of the gasket engages top surface 13 of flange 12, and the lower outer edge portion 28 engages top surface 9 of cylinder block 2. Before the cylinder head is bolted to the cylinder block, the central, uppermost surface 29 of gasket 26 extends above the horizontal plane of the top of upper edge portion 14 of sleeve 5. When the cylinder head is bolted to the cylinder block, gasket 26 is deformed to the position indicated in dotted lines in FIG. 2. In this position, crowned surface 29 is still slightly higher than the plane of the top of upper edge portion 14, and provides an effective seal throughout the area of its engagement with lower face 17 of the cylinder head. Gasket 26 confines the explosion pressure within the upper portion of opening 6 and the very limited area of the space 16 between surfaces 14 and 17. It also prevents the transmission of excessive temperatures to supplementary gasket 25. In addition to providing a tight seal, the deformation of gasket 26 increases the area of its engagement with face 17. Lower edge portions 27 and 28 of gasket 26 are spread slightly by deformation of the gasket and are pressed against surfaces 13 and 19 respectively, to cooperate with surface 29 to provide three separate sealing zones. Edge portions 27 and 28 particularly provide a liquid seal against any water that might seep out of the annular joint between the adjacent peripheral surfaces of sleeve 5 and the cylinder block.

Whenever cylinder head 18 is removed from the cylinder block for any reason, regardless of the length of time gasket 26 has been under deformation, gasket 26 will recover a substantial portion of its original position so that crowned surface 29 is above the top of the upper edge portion 14 of sleeve 5. Accordingly, when cylinder head 18 is to be replaced, gasket 26 may be used again.

Although I have described a preferred embodiment of the invention in considerable detail, it will be understood that the description thereof is intended to be illustrative, rather than restrictive, as many details of construction may be modified or changed without departing from the spirit or scope of the invention. Accordingly, I do not desire to be restricted to the exact construction disclosed.

I claim:

1. A cylinder sleeve seal comprising an annular gasket having an arcuate cross sectional configuration, said gasket having an inner edge adapted to seat on a surface, an outer edge adapted to seat on a surface in a different plane, and an arcuate crowned surface engageable with a member adapted to exert compressive force against said gasket to urge each of said edges against the surface on which it is seated.

2. A cylinder sleeve seal comprising an annular gasket subject to compression in its position for intended use between vertically spaced members, said gasket having an arcuate cross sectional configuration, said gasket being adapted to provide three separate sealing zones spaced from each other between vertically spaced members when compressed between said members, said gasket having sufficient resilience to enable it to substantially recover its original configuration after release from said compression, whereby it may be reused for sealing purposes in similar environment.

3. A cylinder sleeve seal comprising an annular gasket adapted to seat on a cylinder block in which a cylinder sleeve is mounted and on a surface of said sleeve in a plane below the uppermost surface of said sleeve, said gasket having an arcuate cross sectional configuration with the arcuate crowned surface of said gasket extending above the plane of the uppermost surface of said sleeve.

4. A cylinder sleeve seal comprising an annular gasket of material adapted to withstand heat, said gasket having an arcuate cross sectional configuration and sufficient resilience to enable it to recover a substantial portion of its original position after release from deformation, said gasket having an inner diameter larger than the inner diameter of the cylinder sleeve it is intended to seal and smaller than the outer diameter of said sleeve, and an outer diameter larger than the outer diameter of said sleeve.

5. A cylinder sleeve seal comprising an annular gasket of stainless steel consisting essentially of between 17 and 19% chromium, between 8 and 10% nickel, up to .15% carbon, up to 2% manganese, up to 1% silicon, up to .045% phosphorus, up to .03% sulphur and the remainder iron, said gasket having an arcuate configuration and sufficient resilience to cause it to recover a substantial portion of its original position after release from compression.

6. In combination, a cylinder block having a bore, a cylinder sleeve mounted in said bore, said sleeve having a flange, the top surface of said flange lying in a plane below the top surface of said sleeve and slightly above the plane of the top surface of said cylinder block, and an annular gasket having its inner and outer edge portions seated on the top surface of said flange and the top surface of said cylinder block respectively, said gasket being arcuate in cross section and having its uppermost crowned surface extending above the plane of the top surface of said sleeve.

7. In combination, a cylinder block having a bore, a cylinder sleeve mounted in said bore, said sleeve having a flange, the top surface of said flange lying in a plane below the top surface of said sleeve and slightly above the plane of the top surface of said cylinder block, and an annular gasket having its inner and outer edge portions seated on the top surface of said flange and the top surface of said cylinder block respectively, said gasket being arcuate in cross section and having its uppermost arcuate surface extending above the plane of the top surface of said sleeve, said gasket having sufficient resilience to recover a substantial portion of its original position upon release of pressure urging it downwardly against the upper surfaces of said sleeve and block.

8. In combination, a cylinder block having a bore, a cylinder sleeve mounted in said bore, said sleeve having a flange, the top surface of said flange lying in a plane below the top surface of said sleeve and slightly above the plane of the top surface of said cylinder block, and an annular gasket having its inner and outer edge portions seated on the top surface of said flange and the top surface of said cylinder block respectively, said gasket being arcuate in cross section and having its uppermost arcuate surface extending above the plane of the top surface of said sleeve, and a cylinder head pressing said gasket between it and said sleeve and block, said gasket being able to withstand the heat and pressure created by the explosion of fuel in said cylinder sleeve to form three separate sealing zones between said cylinder head and the sleeve and block.

9. In combination, a cylinder block having a bore, a cylinder sleeve mounted in said bore, said cylinder sleeve having an open upper end, an annular gasket encircling the open end of said cylinder sleeve, said gasket being arcuate in cross section, and a cylinder head secured to said cylinder block so as to press said gasket between the bottom face of said cylinder head and the top surfaces of said cylinder block and cylinder sleeve, said gasket having sufficient resilience to recover a substantial portion of its original position upon removal of said cylinder head.

10. In combination, a cylinder block having a bore, a cylinder sleeve mounted in said bore, said cylinder sleeve having an open upper end, an annular gasket encircling the open end of said cylinder sleeve, said gasket being arcuate in cross section, and a cylinder head secured to said cylinder block so as to press said gasket between the bottom face of said cylinder head and the top surfaces of said cylinder block and cylinder sleeve and thereby form three spaced concentric sealing zones surrounding the open end of said cylinder sleeve, said sealing zones being effective against the passage of exhaust gases between said cylinder block and said cylinder head when fuel is exploded in said cylinder sleeve.

11. In combination, a cylinder block having a bore, a cylinder sleeve mounted in said bore, said cylinder sleeve having an open upper end, an annular gasket encircling the open end of said cylinder sleeve, said gasket being arcuate in cross section, and a cylinder head secured to said cylinder block so as to press said gasket between the bottom face of said cylinder head and the top surfaces of said cylinder block and cylinder sleeve and thereby form three spaced concentric sealing zones surrounding the open end of said cylinder sleeve, said sealing zones being effective against the passage of exhaust gases between said cylinder block and said cylinder head when fuel is exploded in said cylinder sleeve, said gasket having sufficient resilience to recover a substantial portion of its original position upon removal of said cylinder head.

12. A cylinder sleeve seal comprising an annular gasket adapted to seat in one plane on a cylinder block in which a cylinder sleeve is mounted and on a surface of said sleeve in a plane different from the plane of said cylinder block, said gasket having an arcuate cross sectional configuration with the arcuate crowned surface of said gasket extending above both the said planes.

References Cited by the Examiner
UNITED STATES PATENTS

| | | | |
|---|---|---|---|
| 2,378,045 | 6/45 | Sorensen | 92—171 |
| 2,679,241 | 5/54 | Dickson | 123—193 |
| 2,883,211 | 4/59 | Grass | 285—367 |

KARL J. ALBRECHT, *Primary Examiner.*